3,592,822
ADDUCTS OF HEXAHALO ACETONES AND HETEROCYCLIC NITROGEN COMPOUNDS
Everett E. Gilbert, Morristown, and Edmund J. Rumanowski, Dover, N.J., assignors to Allied Chemical Corporation, New York, N.Y.
No Drawing. Filed Jan. 2, 1969, Ser. No. 789,065
Int. Cl. C07d 49/36, 49/38, 55/04
U.S. Cl. 260—308                                6 Claims

ABSTRACT OF THE DISCLOSURE

Adducts of fluoroperhaloacetones with imidazole, benzimidazole and benzotriazole useful as anticonvulsants, herbicides and antifertility agents against house flies.

This invention relates to new adducts of fluoroperhaloacetones with heterocyclic nitrogen compounds containing the reactive >NH group as a part of a 5 membered heterocyclic ring. Specifically, heterocyclic nitrogen compounds which interact with the fluoroperhalo acetones to form the new adducts are I. imidazoles of the formula

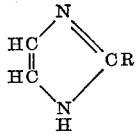

wherein R represents hydrogen or a lower alkyl group of 1–4 carbon atoms;

II. benzimidazoles of the formula

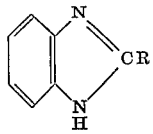

wherein R is as defined above; and

III. benzotriazole of the formula

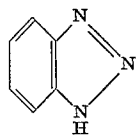

We have found that the heterocyclic nitrogen compounds imidazole, benzimidazole, and their lower alkyl substituted derivatives and also benzotriazole react readily with hexafluoroacetone or a hydrate thereof at temperatures in the range of about 0° C. to about 100° C., with or without the presence of an inert liquid reaction medium, to form adducts. Imidazole, benzimidazole and their lower alkyl substituted derivatives react also with symmetrical tetrafluorodichloroacetone or a hydrate thereof, under similar conditions, to form adducts.

The new adducts of our invention derived from imidazole or benzimidazole or their lower alkyl substituted derivatives having 1–4 carbon atoms in the alkyl group, with either hexafluoroacetone (6 FK) or symmetrical tetrafluorodichloroacetone (4 FK) are salt-like adducts composed of one mole of fluoroperhaloacetone, one mole of imidazole compound and one mole of water. Specific compounds in these groups are listed below and designated by empirical formulas and probable structural formulas.

Ia. $C_6H_6F_6N_2O_2$                     Ib. $C_6H_6Cl_2F_4N_2O_2$

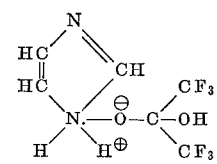 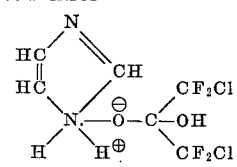

6 FK—Imidazole—$H_2O$          4 FK—Imidazole—$H_2O$

Ic. $C_7H_8F_6N_2O_2$                     Id. $C_7H_8F_4Cl_2N_2O_2$

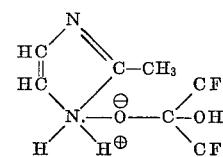 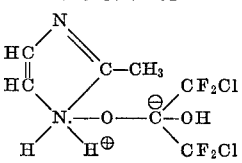

6 FK—2-methylimidazole—$H_2O$
                          4 FK—2-methylimidazole—$H_2O$ IIa. $C_{10}H_8F_6N_2O_2$                   IIb. $C_{10}H_8F_4Cl_2N_2O_2$

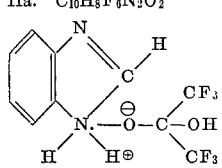 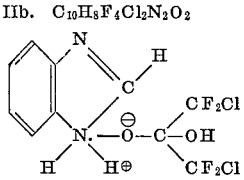

6 FK—benzimidazole—$H_2O$     4 FK—benzimidazole—$H_2O$

IIIa. $C_{11}H_{10}F_6N_2O_2$              IIIb. $C_{11}H_{10}F_4Cl_2N_2O_2$

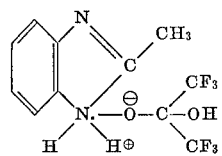 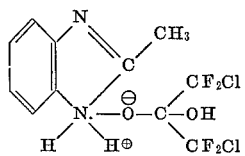

6 FK—2-methylbenzimidazole—$H_2O$
                       4 FK—2-methylbenzimidazole—$H_2O$ The single new adduct derived from benzotriazole is composed of one mole of hexafluoroacetone and two moles of benzotriazole with no water of hydration, and can be designated by the empirical formula and the probable structural formula shown below.

IVa. $C_{15}H_{10}F_6N_6O$

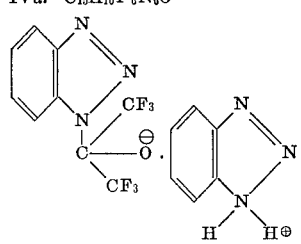

The adducts of our invention are all white crystalline solids with melting points ranging from 85° C. to 165° C. They are soluble in acetone, poorly soluble in benzene, ether and 1,2-dichloroethane at room temperature (ca. 25° C.). Adducts of the fluoroacetones with imidazole are soluble in water; the adducts with benzimidazole and benzotriazole are substantially insoluble in water. The adducts of hexafluoroacetone with imidazole and benzotriazole are stable upon melting; the other adducts decompose upon melting. All the adducts are reactive with bases such as sodium hydroxide, potassium hydroxide and ammonium hydroxide, yielding the starting heterocyclic compound.

The new adducts of our invention are useful as anticonvulsants, all showing at least moderate activity in reducing or preventing maximal electroshock, and all but one of the compounds exhibit similar activity in affording protection against metrazole-induced convulsions.

The new adducts also have additional utility as herbicides, being particularly active against crab grass, and some exhibit antifertility action against house flies.

The new adducts of our invention can be prepared according to the following reactions A
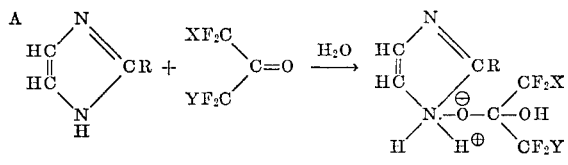

imidazole  hexahaloacetone  adduct wherein X and Y are members of the group consisting of fluorine and chlorine, R represents hydrogen or a lower alkyl group of 1–4 carbon atoms.

B
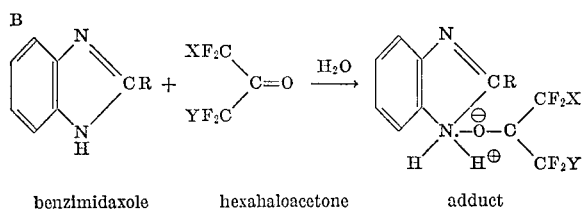

benzimidazole  hexahaloacetone  adduct wherein X, Y and R are as defined above.

C
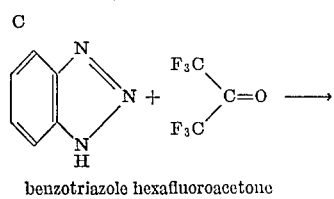

benzotriazole hexafluoroacetone

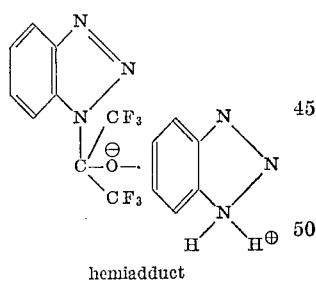

hemiadduct

The reactions are carried out with the particular hexahaloacetone, either in anhydrous or hydrated form. When using the anhydrous ketone, the non-hydrated adducts are first formed. In the case of the imidazole and benzimidazole compound adducts, the non-hydrated adducts, on exposure to atmospheric moisture, produce the adduct hydrate. When a ketone hydrate is used in the initial reaction of these two types of compounds the adduct hydrate is formed directly. In the case of the benzotriazole reactant, the non-hydrated hemiadduct is formed with hexafluoroacetone, whether the anhydrous or hydrated compound is used. No adduct results when the symmetrical tetrafluorodichloroacetone is used.

The following specific examples further illustrate our invention. Parts are by weight except as otherwise noted.

EXAMPLE 1

Imidazole-Hexafluoroacetone

Imidazole (7 grams-0.1 mole) was slurried in 300 ml. anhydrous diethyl ether. Hexafluoroacetone gas (19 grams-0.11 mole) was passed in at room temperature with stirring. The imidazole gradually dissolved, giving a clear solution. The solution became slightly warm (30° C.) as heat was evolved during reaction. Then, a white solid began to separate. This was filtered. Within a few seconds the crystalline filter cake collapsed to a gelatinous mass. It was, however easily ground to a white, free-flowing powder, after standing several hours at room temperature. The yield was 23 grams. It was recrystallized from ethylene dichloride (M.P. 101° C.). Analytical data showed the compound to be a monohydrate of an imidazole-hexafluoroacetone 1:1 molar adduct. Calculated for $C_6H_6F_6N_2O_2$: 28.6% C; 2.4% H; found: 29.0% C; 2.6% H. The infrared and nmr spectra agree with this structure. The white solid which separated from the reaction mixture is assumed to be the corresponding adduct without water of hydration. This adduct was also made using benzene as the reaction solvent.

Treatment of this adduct with 25% aqueous sodium hydroxide at room temperature regenerated imidazole, indicating that the product is a "complex" easily broken down to its component starting materials.

The solid state infrared spectrogram of the monohydrated adduct of imidazole and hexafluoroacetone (Example 1) shows characteristic relatively sharp absorption bands at frequencies (cm.$^{-1}$) of 625, 710, 745, 825, 870, 925, 945, 1020, 1050, 1125, [1] 1170, 1410, 1580, and a broad absorption band between 2400 and 3100 cm.$^{-1}$.

EXAMPLE 2

Imidazole-tetrafluorodichloroacetone (symmetrical)

Imidazole (3.5 grams, 0.05 mole) was slurried in 100 ml. ethylene dichloride. Tetrafluorodichloroacetone (10 g., 0.05 mole) was added with stirring, at room temperature of about 25° C. The imidazole dissolved, giving a clear solution. The solution became slightly warm (ca. 30° C.) as heat was evolved during reaction. Then a white solid began to separate; the mixture congealed to a solid mass as stirring was continued. The mixture was then heated to 80–90° C., whereupon the solid dissolved giving a clear solution. The anhydrous product crystallized on cooling. It was filtered and exposed to air to remove solvent and to effect hydration. The yield of crude hydrate was 12.5 grams, M.P. 100° C. This adduct was also prepared with benzene as the reaction solvent, and using no reaction solvent. Elemental analysis showed:

| Percent | Theory9 | Found |
|---|---|---|
| F | 26.6 | 26.4 |
| C | 25.3 | 25.9 |
| H | 2.1 | 2.6 |
| N | 9.8 | 10.2 |

Analytical and spectroscopic data indicate the formula: $C_6H_6F_4Cl_2N_2O_2$ and probable structure

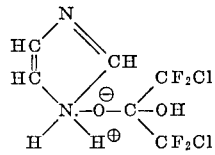

The solid state infrared spectrogram of the monohydrated adduct of tetrafluorodichloroacetone and imidazole (Example 2) shows characteristic, relatively sharp absorption bands at the frequencies (cm.$^{-1}$), of 625, 720, 745, 795, 835, 875, 930, [1] 1045, 1055, 1120, 1170, [1] 1190, [1] 1400, [1] 1585; and a broad absorption band between 2400 and 3100 cm.$^{-1}$. The bands between 1000 and 1200 cm.$^{-1}$ denote (C–F); 2400–3100 (NH+). The bands at 1400 and 1585 are both characteristic of protonated imidazole ring.

---
[1] Most intense band.

EXAMPLE 3

Benzimidazole-hexafluoroacetone

In a vessel equipped for reflux were mixed 2.3 grams (0.02 mole) of benzimidazole and 18 grams (0.08 mole) of hexafluoroacetone trihydrate and the mixture was refluxed at 105° C. for 80 hours. The resulting product was drowned in water and filtered yielding 4.2 grams of crystalline product melting at 147° C. Elemental analysis showed: theory for carbon 39.8%, for hydrogen 2.7%, for fluorine 37.8%. Found 39.7, 3.0, 38.5. Its empirical formula and probable structure are shown below.

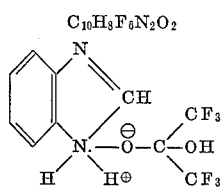

A portion of the adduct was triturated with cold ammonium hydroxide, which produced a white solid melting at 173° C. which indicated that the starting benzimidazole had been regenerated, thus indicating that the addition product is a loosely bound adduct easily decomposed to the starting materials.

The solid state infrared spectrogram of the monohydrated adduct of benzimidazole and hexafluoroacetone (Example 3) shows characteristic relatively sharp absorption bands at frequencies (cm.$^{-1}$) of 650, 735, 785, 885, 950, 1075 [1], 1135, 1170 [1], 1200, 1295, 1395 and 1400, a broad band between 2400 and 3200, and a sharper band at 3170 cm.$^{-1}$.

EXAMPLE 4

Benzimidazole-tetrafluorodichloroacetone (symmetrical)

Benzimidazole (6 grams, 0.051 mole), 10 grams (0.05 mole) of tetrafluorodichloroacetone and 25 milliliters of anhydrous benzene were mixed and heated to reflux for 10 minutes. To the resulting clear solution was added 0.9 ml. (0.05 mole) of water. The solution was immediately converted to a gelatinous paste with heat evolution. The entire crude mass was dried to the solid adduct by heating at 50° C. for 6 hours in a gentle stream of air. The solid adduct was recrystallized from 1,2-dichloroethane. The recrystallized product had a melting point of 135°–142° C. with decomposition. Elemental analysis showed: calculated (percent): C, 35.8; H, 2.4. Found (percent): C, 36.0; H, 2.4.

These data indicate that the adduct is composed of one mole each of 4 FK, benzimidazole and water and has the empirical formula $C_{10}H_8F_4Cl_2N_2O_2$ and the probable structure

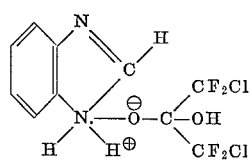

The solid state infrared spectrogram of the monohydrated adduct of benzimidazole and tetrafluorodichloroacetone (Example 4) and shows characteristic, relatively sharp absorption bands at frequencies (cm.$^{-1}$) of 734, 805, 935, 1000, 1045, 1070, [1] 1120, 1170, 1195 and 1380, a broad band from 2400 to 3200 cm.$^{-1}$, and a sharper band system at about 315 cm.$^{-1}$.

[1] Most intense band.

EXAMPLE 5

Benzotriazole-hexafluoroactone

Benzotriazole (6 grams, 0.5 mol) and hexafluoroacetone trihydrate (11 grams, 0.05 mol) were mixed and heated on a steam bath at about 90° C. for 24 hours. The clear solution which resulted was then cooled to about 20° C. whereupon white crystals separated. The crystals were filtered and dried at room temperature (ca. 25° C. 0) for 5 days to drive off residual hexafluoroacetone. The crystals after recrystallization from chloroform or benzene melted at 80°–92° C. Infrared spectroscopy showed that the fluorinated group was not on the benzene ring. Elemental analysis showed 27.2% fluorine, 44.9% carbon and 2.6% hydrogen (theory for di(benzotriazole) adduct 28.2, 44.6 and 2.5) indicating the compound to have the emirical formula $C_{15}H_{10}F_6N_6O$ adduct of the probable structure

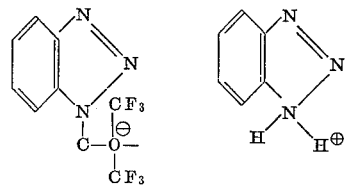

The solid state infrared spectrogram of the non-hydrated adduct of two moles of benzotriazole and one mole of hexafluoroacetone, and shows characteristics, relatively sharp absorption bands at frequencies (cm.$^{-1}$) of 710, 730, 950, 1005, 1080, 1160, [1] 1195, 1220, 1265, 1285, and 1605, a broad band between 2400 and 3200 cm.$^{-1}$ and a sharper band about 3250 cm.$^{-1}$.

EXAMPLE 6

2-methylbenzimidazole-hexafluoroacetone

In a vessel equipped for reflux were mixed 7 grams (0.05 mole) of 2-methylbenzimidazole and 60 grams (0.27 mole) of hexafluoroacetone trihydrate. The mixture was refluxed at about 105° C. for 24 hours. The resulting clear solution was evaporated to dryness and dried on a steam bath at 95° C. in a stream of air, then recrystallized from 1,2-dichloroethane. The recrystallized product had a melting point of 165°–171° C. with decomposition. Elemental analysis showed Calculated (percent): C, 41.8; H, 3.2. Found (percent): C, 41.8; H, 3.2.

Analytical and spectroscopic data indicate the formula $C_{11}H_{10}F_6N_2O_2$ and probable structure

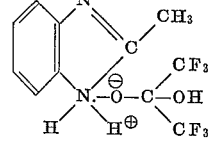

The solid state infrared spectrogram of the monohydrated reaction product of 2-methylbenzimidazole and hexafluoroacetone (Example 6) shows characteristic sharp absorption bands at the frequencies (cm.$^{-1}$) of 605, 705, 745, 810, 850, 860, 950, 1070, 1125, [2] 1160, [2] 1170, [2] 1195, 1295, 1380, 1405, 1450, 1560, 1610, and a strong diffuse band from 2300 to 3300 cm.$^{-1}$.

EXAMPLE 7

2-methylbenzimidazole-tetrafluorodichloroacetone (symmetrical)

In a vessel equipped for reflux 3.3 grams (0.25 mole) of 2-methylbenzimidazole, 6 grams (0.03 mole) of tetrafluorodichloroacetone and 40 ml. of 1,2-dichloroethane

[1] Most intense band.
[2] Strongest group.

were mixed and heated at 70° C. for 30 minutes. The resulting clear solution was cooled to 30° C. Then 0.5 grams (0.02 mole) of water was added. The solid product immediately began to separate and the mixture was converted to a gelatinous paste, indicating hydration. The entire mass was dried by heating at 50° C. for 6 hours in a gentle stream of air. It was recrystallized from 1,2-dichloroethane. The crystallized product had a melting point of 155°–165° C. with decomposition. Elemental analysis showed:

Calculated (percent) C, 37.8; H, 2.9. Found (percent): C, 38.1; H, 3.1.

Analytical and spectroscopic data indicate the formula $C_{11}H_{10}F_4Cl_2N_2O_2$ and probable structure

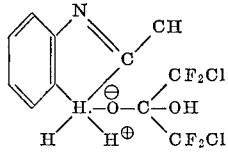

The solid state infrared spectrogram of the monohydrated reaction product of 2-methylbenzimidazole and tetrafluorodichloroacetone (Example 7) shows characteristic relatively sharp absorption bands at the frequencies (cm.$^{-1}$) of 610, 725, 745, 805, 850, 865, 925, 1030, 1070, 1105, [2] 1125, 1165, 1195, 1380, 1405, 1455, 1560, 1615, and a strong diffuse band from 2300 to 33500 cm.$^{-1}$.

EXAMPLE 8

The compounds of Examples 1–5 inclusive were tested for anticonvulsant activity by the procedure of Ewart A. Swinyard et al. in Journal of Pharmacology and Experimental Therapeutics, vol. 106 (1952) pp. 319–320, to evaluate their effectiveness in protecting mice against "Maximal Electroshock Seizure" (MES) and against Metrazol (MET). In carrying out the tests, a series of 5 or 6 mice are given doses of the protective drug to be tested before or after being subjected to electroshock (MES) or Metrazol (MET) in dosages which normally produce convulsions. The MES test is a measure of the ability of the anticonvulsant drug to abolish the hindlimb tonic extensor component of the maximal seizure pattern induced by 50 ma. of current delivered for 0.2 second. The MET test measures ability of the anticonvulsant drug to afford complete protection against seizures induced by subcutaneous injection of a $CD_{97}$ of Metrazol (85 mgm./kg. in mice).

Results of the above tests carried out using the compounds of Examples 1–5 are shown in Table I below:

TABLE I.—ANTICONVULSANT TESTS [1]

| Compound of Example No. | Anticonvulsant activity against — | |
|---|---|---|
| | Maximal electric seizure | Metrazol |
| 1 | AA | A |
| 2 | MA-A | I |
| 3 | MA | MA |
| 4 | A | A |
| 5 | MA | MA |

[1] AA=very active; A=active; MA=moderately active; I=inactive.

It is apparent from the data in Table I that all the compounds of our invention are effective anticonvulsants against electroshock, and all but that of Example 2 are effective in preventing or reducing Metrazol convulsions.

EXAMPLE 9

The compounds of Examples 1–5 inclusive were tested for preemergence herbicidal activity against the common weed pests rye grass, *Lolium multiflorum*, rape *Brassica napus*, and crab grass *Digitaria sanguinalis* in the presence of grain seeds, corn, cotton, wheat and soy beans. In carrying out the tests, the test crop species and test weed seeds are planted in 12" x 8.5" x 4" flats. Crop seeds are planted in single rows and covered with soil, then seeds are broadcast at the rate of about 1 teaspoon full of each of rye and crabgrass, ¼ teaspoon full of rape per flat, and covered with ¼ inch of soil. The test compounds are then applied to the soil as sprays immediately after planting at a rate of 16 pounds of test compound per acre, then the test flats are placed in aluminum trays. Water is added to the trays and allowed to remain until the surface of the soil is uniformly moist. The heated flats are held in the greenhouse, watered by sub-irrigation, for a 16 day period after which they are rated in terms of "Injury Rating" (IR), i.e. a rating based on a scale of 0 to 10 wherein 0 designates no apparent injury; 1, 2, 3 denote slight injury; 4, 5, 6 denote moderate injury; 7, 8, 9 severe injury (plants will die) and 10—plants dead.

Results of the above tests using compounds of Examples 1–5 are shown in Table II below:

TABLE II.—HERBICIDAL TESTS USING COMPOUNDS OF EXAMPLES 1-5 APPLIED AT RATE OF 16 POUNDS ACTIVE HERBICIDE PER ACRE

| Compound of Example No. | Injury rating on— | | | | | | |
|---|---|---|---|---|---|---|---|
| | Corn | Cotton | Wheat | Soybeans | Rye grass | Rape | Crab grass |
| 1 | 0 | 2 | 6 | 4 | 0 | 7 | 3 |
| 2 | 0 | 0 | 0 | 0 | 0 | 0 | 9 |
| 3 | 2 | 2 | 4 | 2 | 9 | 3 | 9 |
| 4 | 0 | 5 | 7 | 1 | 3 | 3 | 9 |
| 5 | 0 | 6 | 1 | 0 | 9 | 6 | 7 |

It is apparent from Table II that all the compounds are effective in one or more types of broad leaf weed control. All but that of Example 1 are excellent in control of crab grass. The compound of Example 1 exhibits good broadleaf control (rape) with some control of crab grass, without significant crop injury except to wheat. The compound of Example 2, while showing no preemergence activity against rape and rye, shows excellent crab grass control, with no crop injury. The compound of Example 3 exhibits excellent grassy weed and crab grass control with little injury to crop plants. The compound of Example 4 exhibits excellent crab grass control, with little or no injury to crop seeds except wheat.

The compound of Example 5 exhibits excellent rye grass control with substantial control of rape and crab grass and little or no injury to crop plants except cotton.

EXAMPLE 10

The new compounds of Examples 1–5 inclusive were tested as insecticides against house flies (*Musca domestica*). In carrying out the tests, dry food consisting of 6 parts powdered non-fat dry milk, 6 parts granulated sugar and 1 part powdered egg was treated with a solution or suspension of the test compound in acetone solution to provide 1 percent of the test compound by weight in the dry food. The treated food was placed in emergence cages containing 50 fly pupae. Cages containing untreated food were used as checks. Oviposition medium was placed in each cage and on the following day the medium was examined for eggs and if none were present the medium was moistened and examined daily for eggs and dead adults.

Results of the above tests are shown in Table III below after 8 days exposure to the toxic food.

TABLE III.—ANTIFERTILITY TESTS IN HOUSE FLIES AFTER 8 DAYS EXPOSURE TO FOOD CONTAINING 1% TEST COMPOUND

| Compound of Example No.: | Percent kill, after 8 days | Eggs laid |
|---|---|---|
| 1 | 100 | None. |
| 2 | 90 | Do. |
| 3 | 0 | Yes. |
| 4 | 98 | None. |
| 5 | 2.1 | Do. |
| Check (no toxicant) | 0 | Yes (normal). |

[1] Most intense band.

The compound of Example 1 was further tested at a concentration of 0.5% by weight in the food, and was found to give 100% kill of adult flies and no eggs laid after the 8 day test period.

It is apparent from Table III that all the compounds of our invention except that of Example 3 are effective in controlling house flies, the compounds of Examples 1, 2 and 4 being effective insecticides, while the compound of Example 5 acts as an antifertility agent, effectively preventing egg laying.

While the foregoing describes the preferred embodiments of our invention, it will be understood that departures can be made therefrom within the scope of the specification and claims.

We claim:
1. Adducts of a fluoroperhaloacetone of the formula

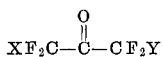

wherein X and Y are the same members of the group consisting of chlorine and fluorine, and a heterocyclic nitrogen compound selected from the group consisting of imidazole, 2-lower alkyl imidazoles, benzimidazole, 2-lower alkyl benzimidazoles and benzotriazole, and wherein, when the heterocyclic nitrogen compound is benzotriazole, both X and Y are fluorine.

2. The monohydrated, solid, 1:1 adduct of imidazole and hexafluoroacetone having the empirical formula $C_6H_6F_6N_2O_2$ and an infrared spectrogram showing characteristic absorption bands at the frequencies in cm.$^{-1}$ of 625, 710, 745, 825, 870, 925, 945, 1020, 1050, 1125, 1170, 1410, 1580 and a broad band between 2400 and 3100 cm.$^{-1}$.

3. The monohydrated, solid, 1:1 adduct of imidazole and symmetrical tetrafluorodichloroacetone having the empirical formula $C_6H_6F_4Cl_2N_2$ and an infrared spectrogram showing characteristics absorption bands at the frequencies in cm.$^{-1}$ of 625, 700, 745, 795, 835, 875, 930, 1045, 1055, 1120, 1170, 1190 and 1585 and a broad band between 2400 and 3100 cm.$^{-1}$.

4. The monohydrated, solid, 1:1 adduct of benzimidazole and hexafluoroacetone having the empirical formula $C_{10}H_8F_6N_2O_2$ and an infrared spectrogram showing characteristic absorption bands at the frequencies in cm.$^{-1}$ of 650, 735, 785, 885, 950, 1075, 1135, 1170, 1200, 1295, 1395, 1440 and a broad band between 2400 and 3200, and a sharper band at 3170 cm.$^{-1}$.

5. The monohydrated, solid, 1:1 adduct of benzimidazole and symmetrical tetrafluorodichloroacetone having the empirical formula $C_{10}H_8F_4Cl_2N_2O_2$ and an infrared spectrogram showing characteristic absorption bands at the frequencies in cm.$^{-1}$ of 735, 805, 935, 1000, 1045, 1070, 1120, 1170, 1195, 1380 and a broad band from 2400 to 3200, and a band system at about 3150 cm.$^{-1}$.

6. The non-hydrated, solid adduct of 2 moles of benzotriazole and one mole of hexafluoroacetone having the empirical formula $C_{15}H_{10}F_6N_6O$ and an infrared spectrogram showing characteristic absorption bands at the frequencies in cm.$^{-1}$ of 710, 730, 750, 1005, 1080, 1160, 1195, 1220, 1265, 1285, 1605, a broad band between 2400 and 3200 with a sharper band at about 3250 cm.$^{-1}$.

References Cited

FOREIGN PATENTS 6410536   3/1965   Netherlands _____ 260—309

ALTON D. ROLLINS, Primary Examiner

U.S. Cl. X.R.

71—92; 260—309, 309.2; 424—269, 273